United States Patent
Newman et al.

(10) Patent No.: US 9,510,669 B2
(45) Date of Patent: *Dec. 6, 2016

(54) METHOD FOR PRODUCING A TOOTHBRUSH HANDLE HAVING AN INNER CAVITY

(71) Applicant: The Procter & Gamble Company, Cincinnati, OH (US)

(72) Inventors: Matthew Lloyd Newman, Mason, OH (US); Li Wen, Mason, OH (US); Andreas Birk, Kronberg (DE); Andreas Bresselschmidt, Kronberg (DE); Andrew Joseph Horton, West Chester, OH (US); Stephen Alan Houghton, Victoria (AU); Siegfried Kurt Hustedt, Kronberg (DE); Scott Andrew Jackson, Cincinanti, OH (US); Jochen Erich Kawerau, Kronberg (DE); Ralph Edwin Neufarth, West Chester, OH (US); Ulrich Pfeifer, Kronberg (DE); Bradley John Phillips, Victoria (AU); Hansjoerg Reick, Kronberg (DE); Richard Darren Satterfield, West Chester, OH (US); Heidrun Annika Schmelcher, Kronberg (DE); Franziska Schmid, Kronberg (DE); Jens Uwe Stoerkel, Kronberg (DE);

(Continued)

(73) Assignee: THE PROCTER & GAMBLE COMPANY, Cincinnati, OH (US)

( * ) Notice: Subject to any disclaimer, the term of this patent is extended or adjusted under 35 U.S.C. 154(b) by 646 days.

This patent is subject to a terminal disclaimer.

(21) Appl. No.: 13/683,655

(22) Filed: Nov. 21, 2012

(65) Prior Publication Data

US 2014/0047656 A1 Feb. 20, 2014

Related U.S. Application Data

(60) Provisional application No. 61/562,675, filed on Nov. 22, 2011.

(51) Int. Cl.
A46B 9/04 (2006.01)
A46D 3/00 (2006.01)
(Continued)

(52) U.S. Cl.
CPC .............. *A46B 17/02* (2013.01); *A46B 5/02* (2013.01); *B29B 11/06* (2013.01); *B29B 11/10* (2013.01);
(Continued)

(58) Field of Classification Search
CPC ............ A46B 17/02; A46B 3/00; A46B 9/04; A46B 11/00; B29D 22/00
(Continued)

(56) References Cited

U.S. PATENT DOCUMENTS 4,802,255 A 2/1989 Breuer et al.
5,052,071 A 10/1991 Halm
(Continued)

FOREIGN PATENT DOCUMENTS

CN 2756064 2/2006
CN 102166064 8/2011
(Continued)

OTHER PUBLICATIONS

U.S. Appl. No. 13/683,445, filed Nov. 21, 2012, Matthew Lloyd Newman et al.
(Continued)

Primary Examiner — Monica Carter
Assistant Examiner — Stephanie Berry
(74) Attorney, Agent, or Firm — James E. Oehlenschlager

(57) ABSTRACT

Methods of producing toothbrush handles having an inner cavity are provided.

6 Claims, 10 Drawing Sheets

(72) Inventors: Andrew M. Uhe, Victoria (AU);
George Michael West, Cincinnati, OH (US); Tilmann Winkler, Kronberg (DE); Christopher Thomas Ryan, Victoria (AU)

(51) Int. Cl.

| | | |
|---|---|---|
| *B29B 11/06* | (2006.01) | |
| *B29D 22/00* | (2006.01) | |
| *A46B 17/02* | (2006.01) | |
| *A46B 5/02* | (2006.01) | |
| *B29C 49/02* | (2006.01) | |
| *B29C 49/04* | (2006.01) | |
| *B29C 49/06* | (2006.01) | |
| *B29C 49/20* | (2006.01) | |
| *B29C 49/24* | (2006.01) | |
| *B29C 49/64* | (2006.01) | |
| *B29B 11/10* | (2006.01) | |
| *B29L 31/42* | (2006.01) | |
| *B29C 49/22* | (2006.01) | |
| *B29C 49/36* | (2006.01) | |
| *B29C 49/38* | (2006.01) | |
| *B29C 49/48* | (2006.01) | |
| *A46B 5/00* | (2006.01) | |
| *B29C 45/16* | (2006.01) | |
| *B29C 45/17* | (2006.01) | |

(52) U.S. Cl.
CPC .............. *B29C 49/02* (2013.01); *B29C 49/04* (2013.01); *B29C 49/06* (2013.01); *B29C 49/20* (2013.01); *B29C 49/2408* (2013.01); *B29C 49/6409* (2013.01); *A46B 5/0095* (2013.01); *A46B 2200/1066* (2013.01); *A46D 3/00* (2013.01); *B29C 45/16* (2013.01); *B29C 45/1704* (2013.01); *B29C 49/22* (2013.01); *B29C 49/36* (2013.01); *B29C 49/38* (2013.01); *B29C 2049/2017* (2013.01); *B29C 2049/2021* (2013.01); *B29C 2049/2412* (2013.01); *B29C 2049/2472* (2013.01); *B29C 2049/4858* (2013.01); *B29C 2049/4869* (2013.01); *B29C 2049/4871* (2013.01); *B29C 2791/006* (2013.01); *B29L 2031/425* (2013.01)

(58) Field of Classification Search
USPC ...................... 15/143.1, 167.1, 22.1; 300/21
See application file for complete search history.

(56) References Cited

U.S. PATENT DOCUMENTS

| | | |
|---|---|---|
| 5,268,005 A | 12/1993 | Suhonen |
| 5,313,909 A | 5/1994 | Tseng et al. |
| 5,564,152 A | 10/1996 | Jeannet et al. |
| 5,722,106 A | 3/1998 | Masterman et al. |
| 5,836,769 A | 11/1998 | Spencer |
| 5,845,358 A | 12/1998 | Woloch |
| 5,884,127 A | 3/1999 | Kim et al. |
| 6,018,840 A | 2/2000 | Guay et al. |
| 6,058,541 A | 5/2000 | Masterman et al. |
| 6,151,745 A | 11/2000 | Roberts et al. |
| 6,475,553 B2 | 11/2002 | Guay et al. |
| 6,553,604 B1 | 4/2003 | Braun et al. |
| 6,818,174 B2 * | 11/2004 | Morawski ........... B29C 45/1704 264/572 |
| 2002/0074698 A1 | 6/2002 | Morawski |
| 2004/0154112 A1 | 8/2004 | Braun et al. |
| 2005/0036821 A1 | 2/2005 | Pfenniger et al. |
| 2005/0170113 A1 | 8/2005 | Hill |
| 2005/0188487 A1 | 9/2005 | Moskovich et al. |
| 2006/0080794 A1 | 4/2006 | Punshon |
| 2006/0151539 A1 | 7/2006 | Tsubaki et al. |
| 2006/0272112 A9 | 12/2006 | Braun et al. |
| 2007/0163064 A1 * | 7/2007 | Wong et al. ................. 15/143.1 |
| 2007/0251040 A1 | 11/2007 | Braun et al. |
| 2014/0137349 A1 * | 5/2014 | Newman .................. A46B 5/02 15/143.1 |
| 2014/0137350 A1 * | 5/2014 | Wen et al. ................... 15/143.1 |

FOREIGN PATENT DOCUMENTS

| | | |
|---|---|---|
| DE | 19531368 | 2/1997 |
| DE | 10023725 | 11/2001 |
| DE | 102005036301 | 2/2007 |
| EP | 0668140 | 8/1995 |
| EP | 0721832 | 4/1999 |
| EP | 1639913 | 3/2006 |
| JP | H1016037 | 1/1998 |
| WO | WO2004077996 | 9/2004 |

OTHER PUBLICATIONS

U.S. Appl. No. 13/683,495, filed Nov. 21, 2012, Cathy Wen et al.
U.S. Appl. No. 13/683,716, filed Nov. 21, 2012, Cathy Wen et al.
U.S. Appl. No. 13/683,744, filed Nov. 21, 2012, Matthew Lloyd Newman et al.
U.S. Appl. No. 13/683,801, filed Nov. 21, 2012, Ulrich Pfeifer et al.

* cited by examiner

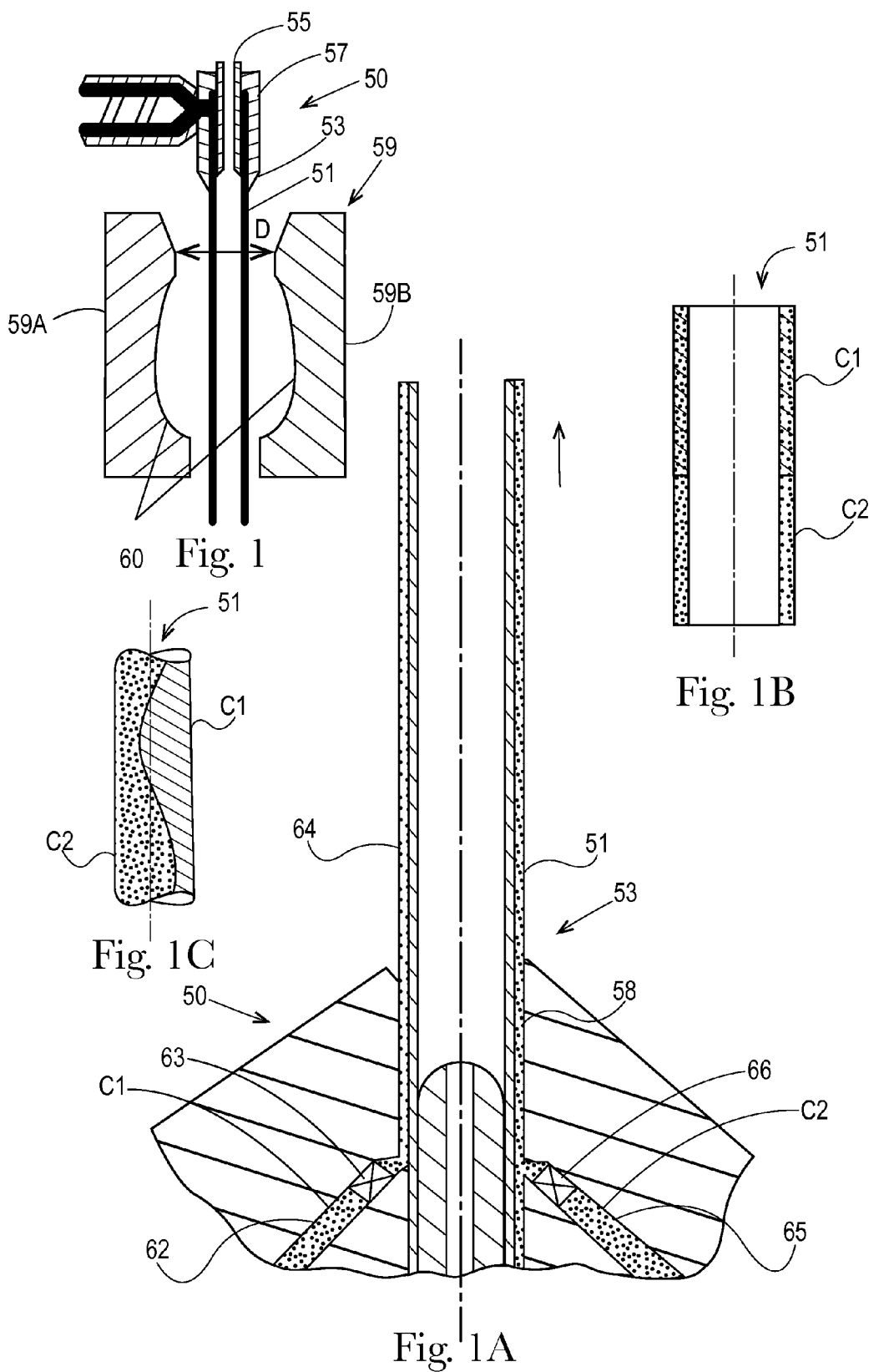

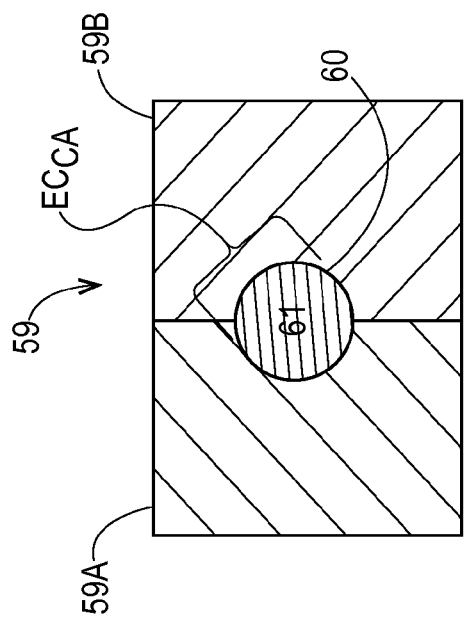
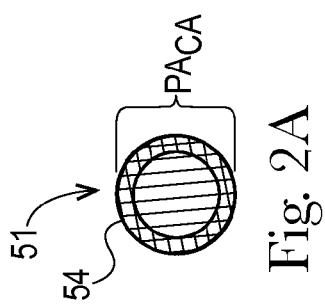
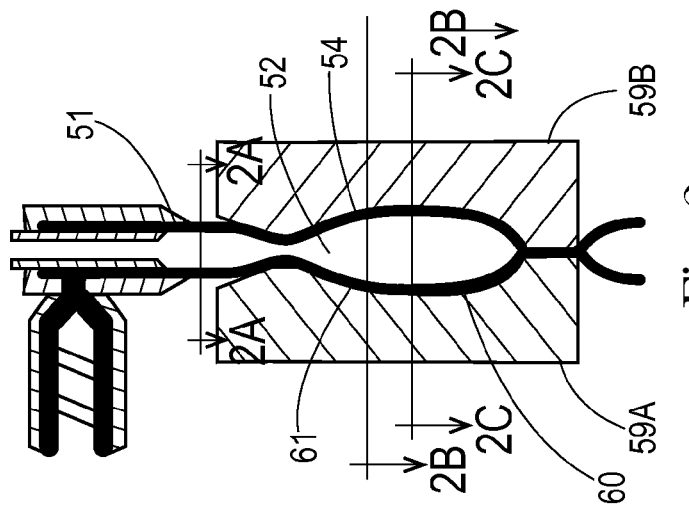

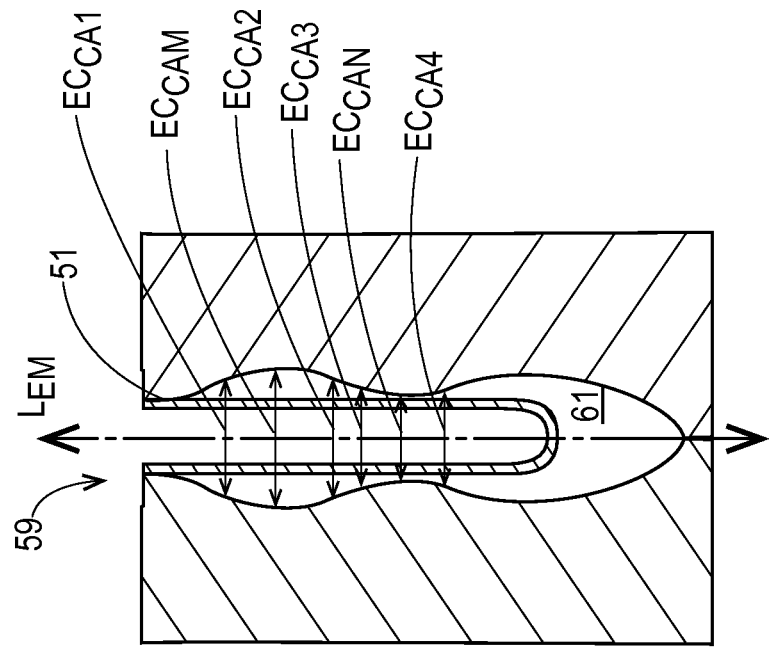
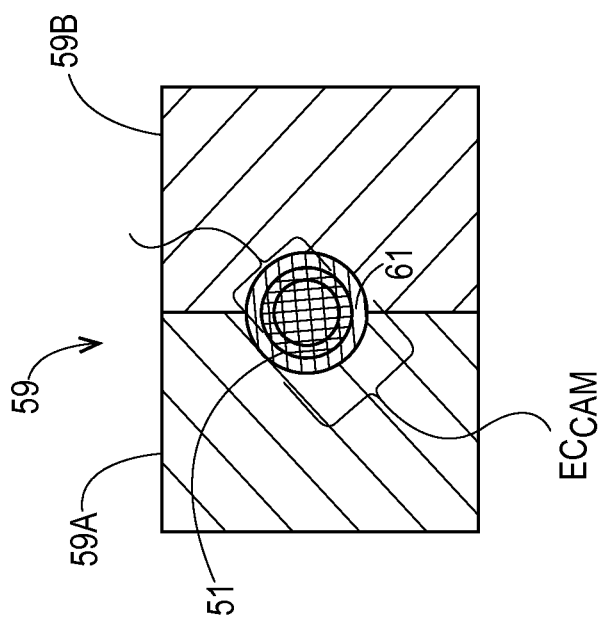

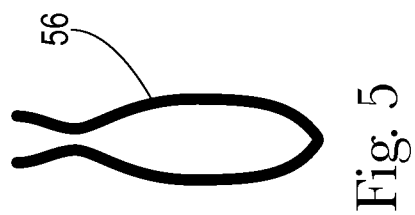
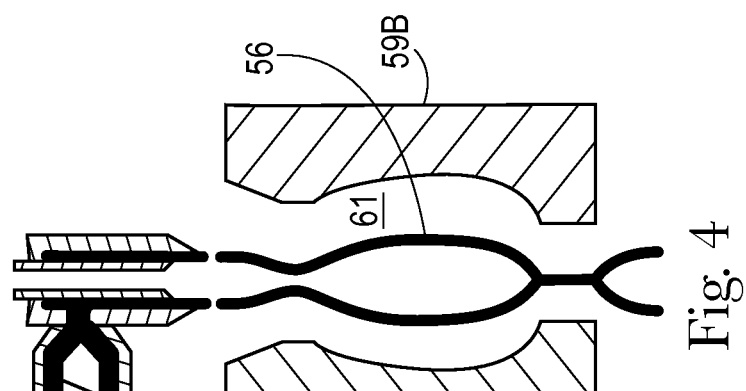
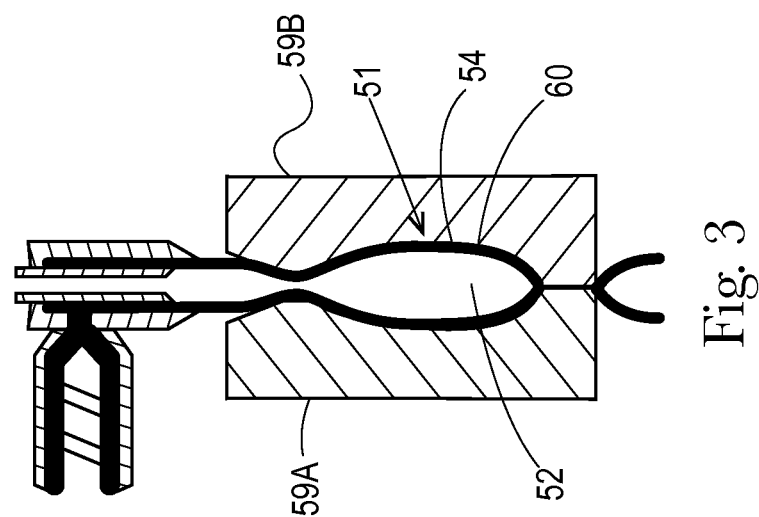

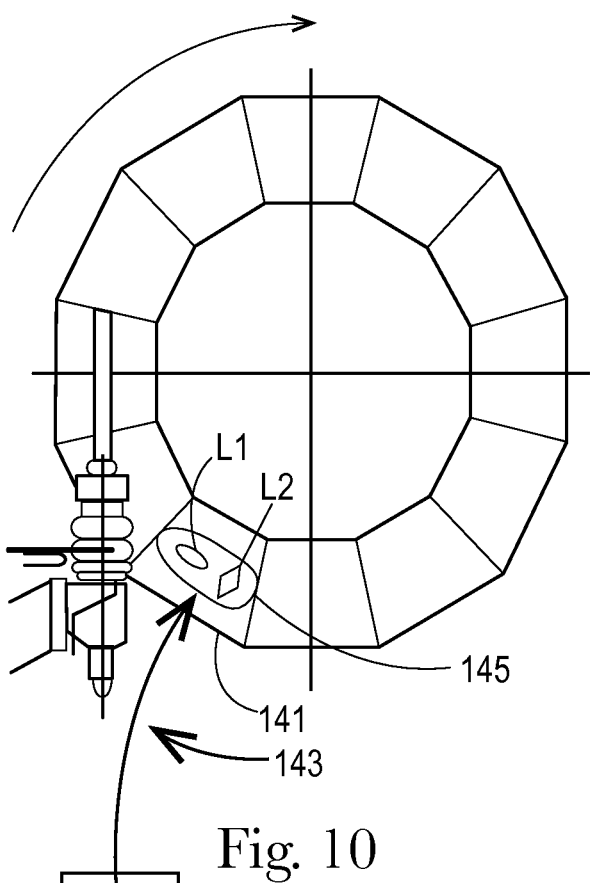
Fig. 10
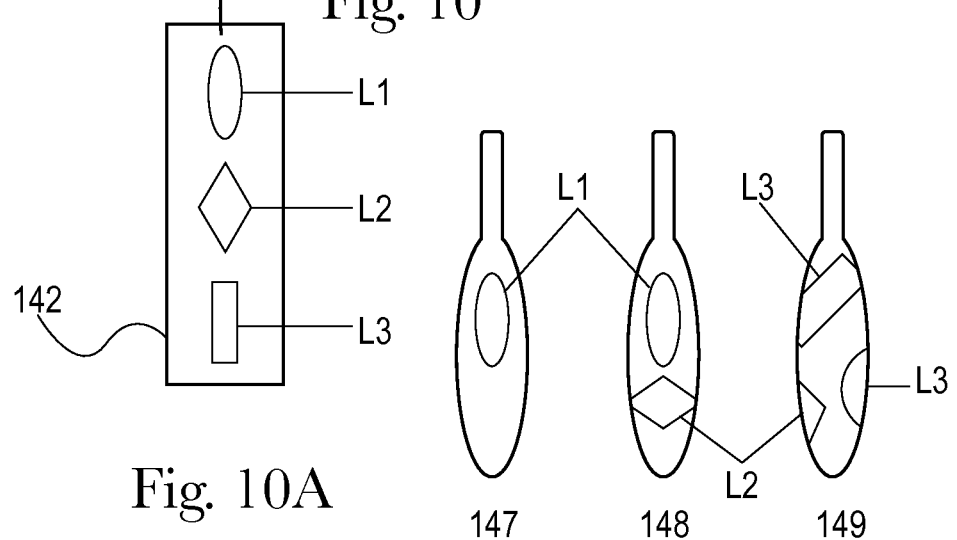
Fig. 10A
Fig. 10B

METHOD FOR PRODUCING A TOOTHBRUSH HANDLE HAVING AN INNER CAVITY

FIELD OF THE INVENTION

The present invention relates to methods of producing personal care articles such as toothbrush handles having an inner cavity

BACKGROUND OF THE INVENTION

Toothbrushes are typically manufactured using an injection molding process. Such an injection molding process is characterized by providing a mold in the shape of the toothbrush and injecting molten plastic through a hot channel nozzle into the mold. The toothbrush is then cooled and ejected from the mold. For example, U.S. Pat. No. 5,845,358 shows such a toothbrush made by injection molding. This injection molding process may comprise a single injection molding step for a toothbrush made from a single component, or it may also comprise two or more injection molding steps for toothbrushes made from two or more components or materials. The second or subsequent materials may be of a significantly softer durometer than the first material to increase grip or provide distinctive design elements. Such an injection molding process is characterized by providing a mold in the shape of a portion of the toothbrush and injecting a first molten plastic through a hot channel nozzle into the mold, waiting some time for the part to sufficiently cool, then transferring the solid or semi-solidified part to a second molding cavity where a second material is injected into the void formed by the combination of the second mold and some surfaces of the first molded part. The toothbrush is then cooled and ejected from the mold. For example, U.S. Pat. No. 6,276,019 shows such a toothbrush made by injection molding. One of the limitations of the conventional injection molding processes is that large diameter handles cannot be produced in an efficient manner, due to the cost of increased material and lengthened cooling times, resulting from the increased mass of material used. A second significant limitation of conventional injection molding is that in requires multiple steps, multiple injection nozzles and multiple cavity sets to make a multiple-component toothbrush.

Toothbrushes with increased handle diameters provide substantial advantages, for instance they can provide increased gripping area for children, increasing the ability of children to handle and use toothbrushes; also people with disabilities such as arthritis sometimes have difficulty in handling toothbrushes due to difficulty in flexing the joints in their hands. Such difficulties are considerably relieved by means of toothbrushes having increased handle diameters. Additionally, the larger cross section handles on the toothbrushes are better for the user from an ergonomic point of view.

Toothbrushes with high-friction and/or low-durometer regions of a second material on the outer surface also provide substantial advantages in gripping. Low-durometer materials, such as those materials whose hardness is measured at less than approximately 90 on the Shore A scale, provide advantages in grip by deforming under the range of comfortable gripping forces. The deformation assists in holding the brush uniformly in position in the hand, and also provides a pleasing tactile feedback. Addition of high-friction grip surfaces directly reduces the squeezing force necessary to maintain a stable orientation of the brush bristles during use. Due to their low strength, however, toothbrushes made entirely from high-friction, low-durometer material are unlikely to exhibit the bend strength necessary to provide adequate force to brush in a conventional grip style. Thermoplastic Elastomers (TPEs) in the hardness range of Shore A 20-90 are a common second, third or subsequent material used to improve grip on toothbrushes and other personal care articles.

Variations in cross sectional area, including both larger and smaller cross sectional areas, along the length or major axis of the brush assist the user in the grip and handling of the brush during use, when it must be rapidly moved, often while wet or slippery. Additionally, materials that maintain a higher coefficient of friction when wet, including TPEs in the above-mentioned hardness range can assist in wet-grip situations.

Even though there are advantages to toothbrushes having increased handle diameters the use of injection molding to manufacture toothbrushes with larger cross section handles has at least seven disadvantages:

First—the toothbrush is more expensive due to the use of more plastic to make the toothbrush. The material used to create the toothbrush handle increases approximately with the square of the diameter of the handle.

Second—the cost of manufacture is increased because the time needed to cool and solidify the toothbrush increases considerably. The increased cooling time is due both to the increased quantity of hot plastic, and the larger cross section of the toothbrush. As plastic has a relatively low thermal conductivity, extracting heat from the center of the brush is substantially more difficult with an increased cross section. It is known to those familiar in the art that overall cooling time for all molding cycles for a multi-component brush can be minimized by balancing the size of each shot of plastic so that the brush is substantially uniformly divided by weight for each component, however this has the drawback of requiring a greater fraction of use of an expensive material, typically TPE, than would otherwise be required. In essence, both material use and capital equipment time cannot both be simultaneously optimized for this type of injection molded toothbrush.

Third—most thermoplastics shrink during cooling and solidification. Shrinkage can be mitigated by packing additional molten plastic into the center of the handle through the injection gate as the outer edges of the handle cool, however this mitigation loses effectiveness as the injection gate is placed away from the thickest portion of the handle and placement of the gate, which will have some tactile vestige, in the thick, gripping portion of the handle can lead to dissatisfaction during use. For many toothbrush handle designs, packing alone cannot mitigate the visible surface shrinkage and surface defects and internal defects associated with an increased handle cross section. These surface defects can be manifested as unintentional variations in surface gloss or texture, which contribute negatively to the look and feel of the part. Internal defects can be manifested as voids or bubbles inside the plastic, which can weaken the handle visibly or invisibly, depending on the degree of transparency of the plastic. It is known to those familiar in the art that a second component can be used to cover or hide negative cosmetic features such as gate vestiges or sink marks, however this cannot by nature work on the final shot which must necessarily have an uncovered gate vestige and may also contain sink marks in thick sections.

Fourth—the injection molding process requires sufficient energy addition to fully melt the plastic to a liquid state, so that it can travel under pressure through the runner, nozzle, and gate to completely fill the injection mold cavity.

Fifth—the filling and packing of the plastic into the injection mold cavity requires very high pressures, typically thousands of pounds per square inch, which necessitates mold cavities made from very high-strength materials, which are expensive and time-consuming to create. These extremely high pressures can in fact limit the speed of the manufacturing process by requiring complete or near-complete cooling and/or solidification of one plastic shot prior to injection of the subsequent shot.

Sixth—the injection of multiple shots of plastic in multiple steps necessarily requires each component of material to have at least one unique mold cavity portion which significantly adds to expense, complexity and difficulty in molding, especially where plastic and metal meet to form an edge, also known as a shutoff.

Seventh—in multi-cavity production, the balance of fill between shots is especially difficult to control with TPEs, as they have a narrow range of processing temperatures and their viscosities do not vary substantially over this range.

In an attempt to overcome the difficulties associated with the use of injection molding to produce toothbrush handles having increased diameters, it has been suggested to produce toothbrush handles having a hollow body. For example, EP 0 668 140 or EP 0 721 832 disclose the use of air assist or gas assist technology to make toothbrushes having hollow, large cross-sectional handles. In the disclosed process, molten plastic is injected near the base of the toothbrush handle, wherein subsequently a hot needle is inserted into the molten plastic to blow gas into the molten plastic which is then expanded towards the walls of the injection mold. In a similar manner, U.S. Pat. No. 6,818,174 B2 suggests injecting a predetermined amount of molten plastic into the cavity to only partially fill the mold cavity and subsequently inject a gas through a gas injection port formed in the injection mold to force the molten plastic into contact with the walls of the mold cavity. Such injection molding processes using additional air injection have substantial difficulty forming hollow handle bodies with substantially uniform wall thickness, and as such, the potential for optimization of a handle for maximum ergonomic function in minimum material weight and manufacturing efficiency is limited. A further drawback to such injection molding processes in U.S. Pat. No. 6,818,174 B2 is the creation of a vent hole for the gas. EP 0 668 140 provides a possible solution to this problem via use of a moving injection pin to create a sealed part, however the integrity of this seal under the injection molding pressures created in the second shot is highly sensitive to processing conditions and is therefore not known. The vent hole is formed at the interface of molten plastic and high-pressure gas (and not by mold steel) and thus cannot be made predictably or with high precision. A still further drawback of hollow-handled toothbrushes made using gas-assist injection molding relates to the application or installation of a second, third or subsequent material to the toothbrush by injection molding, or overmolding, where the overmolded material may, in the process of sealing the necessary gas vent, intrude substantially into the hollow void created in the first gas injection step, as there is nothing to stop it besides friction and the near-atmospheric pressure inside the void. EP 0 721 832 illustrates this effect in detail. While this may still result in a cosmetically-acceptable part, it prevents use of shot-size-limiting devices such as valve gates and can add substantially to the cost of the part. Gas-assist injection molding does not substantially reduce injection pressure or melt energy required to form a plastic article. And as with all other known injection molding processes, multiple cavities and injection steps are required to add each material to the molded article.

A conventional method to create toothbrush handles having increased cross sections, such as electromechanical toothbrush handles, is to manufacture discrete parts of the handle separately using injection molding, then to assemble these parts in either a separate non-injection molding step, or in a subsequent injection molding step, or most often some combination of the two, whereby the discrete parts from the first step or steps are inserted into an injection mold first and one or more additional materials are injected around them, creating a hollow body from multiple parts. This manufacturing method still has the drawbacks of: requiring the complete melting of plastic, high pressures, associated equipment involved with injection molding, and in addition may have added labor expense associated with both in-mold and out-of-mold assembly of discretely-molded parts, plus the added expense and inconvenience of multiple steel or aluminum mold cavity sets per part manufactured. The use of injection molding to create multiple discrete parts has also the disadvantage that each part must not contain any substantial undercut from which the mold core forming a concave surface of the injection-molded part could not be extracted from the part after molding; or in the case where such undercut exists, it must be created carefully by means such as collapsing mold cores and is thus subject to extensive constraints on the surrounding geometry. Further, mold cores must typically contain some mechanism to cool or remove heat, and would thus be difficult or impossible to create to make internal geometry for most manual toothbrushes which may have diameters of 10 mm and lengths beyond 150 mm. The lack of undercuts in discrete parts combined with the length and diameter of cores required to make non-undercut handle parts combined with the desire for multiple areas of variation in cross sectional area on a toothbrush handle would thus require any discretely-assembled handles to have multiple mating surfaces which would preferably require seals to maintain barriers to moisture and debris, even under time and repeated use. To eliminate the need for gaskets and expensive, pliant materials, these seals are typically made using permanent-fastening operations such as ultrasonic welding or gluing.

Installation of soft-touch or second materials to hollow molded articles can be made by other means such as welding, gluing or use of flexibility of the soft-touch material to itself grip an undercut pre-molded into the main article. These methods all have disadvantages however in long-term adhesion, especially to thermoplastics with less-active surfaces made from materials such as polypropylenes. Durable articles made from multiple components which must be used in unpredictable circumstances and environments such as consumers' bathrooms must necessarily be constructed more robustly than for example, disposable articles or packages.

Electromechanical toothbrushes in particular are susceptible to problems of assembly, as they are necessarily hollow in order to include batteries, motors and associated electrical linkages and drive components which must be all placed inside with some degree of precision. To avoid the problems and expense of welding plastic parts together and multiple assembly steps of a sealed outer shell, it has been proposed to blow mold the handle for electromechanical toothbrushes. In the assembly of a blow molded electromechanical toothbrush it is necessary to leave the blow molded portion of the handle open in at least one end to accommodate the motor, batteries, and drive system components. In this process, the minimum diameter of at least one opening to the blow molded handle must exceed the smallest linear dimension of every component that will be inserted. Such a large opening would be a drawback in a non-electromechanical handle, which has no need to accommodate internal component entry, and would necessitate an overly-large second part or cap to prevent intrusion and collection of water, paste, saliva and other detritus of conventional use. Such an overly-large opening, if positioned near the head, would interfere substantially with ergonomic use of the brush. Additional constraints to the geometry on the inside surface of the cavity, for example to locate motors, housings, batteries, etc. which must be positioned inside accurately as to be rigidly fixed will also be detrimental to the overall blow molding process, as the majority of the inner cavity surface of a blow molded part cannot be defined directly by steel in the mold surfaces, and is instead defined indirectly by steel on the outer surface of the handle combined with the wall thickness of the parison, blowing pressure and stretch ratio of the final part to the original parison or preform thickness. Such constraints of these process variables will necessarily limit manufacturing efficiencies.

To accommodate activation of electrical components via a standard button or mechanical switch, at least some portion of a blow molded electromechanical toothbrush handle should be made thin enough to flex substantially under pressure of a finger or hand squeeze. Such a thin-walled structure or film-walled structure necessarily requires some strengthening mechanism to ensure durability and rigidity under use. An internal frame or cap, as described in WO 2004/077996 can be used to provide this necessary strengthening mechanism in an electromechanical toothbrush, but would be a drawback to a manual brush, which must contain no additional components to function adequately, in extra expense, complexity and additional load-bearing parts. Further, due to the linear nature of the motor, power source, and drive shaft of electromechanical toothbrushes there are no or minimal variations to the cross-sectional area of the inner cavity; such that the inner cavity walls provide mechanical support to the internal components to reduce or eliminate unwanted movement or shifting. Alternately, it would be required to cut or drill a hole in the blow molded part and then to fasten somehow a flexible cover to transmit the mechanical motion from the outside of the brush to the switch inside.

An electromechanical toothbrush handle, made by blow molding or injection molding, is typically manufactured with an opening at both ends: At a distal end there is typically an opening to accommodate the mechanical translation of power through a drive mechanism to the toothbrush head, and at a proximal end there is typically an opening to accommodate insertion of components during manufacturing and possibly also insertion or removal of the battery by the user. Such a second opening would be unnecessary for a manual toothbrush and would create drawbacks in the need for additional seals and mechanical fasteners. In some blow molding processes, the formation of openings at the distal and proximal ends of the molded part are intrinsic to the process and would benefit the formation of a double-open-end handle, but would not be necessary for a manual toothbrush handle.

To reduce weight while maintaining stiffness, some toothbrush handles are made from bamboo or balsa wood, however these materials have disadvantages in that they are not easily formable into complex three-dimensional shapes which can be comfortably gripped. Further, these materials are anisotropic, meaning they have elastic moduli and yield strengths or ultimate strengths which vary with the direction of applied load. Carbon-fiber composites and glass-filled injection-molded plastics are other common examples of anisotropic materials which could be used to make lighter and stronger toothbrushes. Articles made from these materials must therefore be formed with their strongest axis or 'grain' aligned substantially with the major axis of the article in order to resist fracture during the bending forces common to use. Both carbon fiber and glass-filled thermoplastic composites also tend to fail in a brittle manner, with little ductility. This type of failure is undesirable in a device that is placed in the mouth: More desirable is a device which, when subjected to loads substantially greater than their design loads, fail first in some permanent bending mode versus a sudden fracture. Further, these materials do not contain intrinsically all of the properties necessary to create light weight, strength in bending and soft-touch, high-friction grip. This creates an extra necessary step in the preparation of the material prior to forming or machining. This alignment of the grain also can present a specific disadvantage to woods in general in that the presentation of splinters of material is most likely to occur in the direction aligned to typical forces applied by the hand during brushing.

To make a toothbrush without relying on anisotropic materials such as woods, the articles could be made lighter through the use of non-homogeneous but isotropic materials, such as foamed plastics. Foamed plastics present an advantage in that they can offer a higher strength-to-weight ratio than solid plastics without regard to material orientation. The overall weight savings possible with foamed plastics may be limited however, as the bubbles inside the plastic which create the weight savings also create stress concentrations which will severely reduce strength in tension and can reduce ductility. While foamed plastics can provide substantial strength in compression (and are used for exactly this purpose in applications such as packing materials where material weight combined with resistance to compressive crushing is a critical issue) the weakness in tension severely affects bending strength and prevents uniformly-foamed plastics from serving as load-bearing elements in articles which must maintain strength and stiffness in bending during normal use.

Blow molding technology is a high volume manufacturing process. One of the key challenges for most high volume production is managing variety in the form of shape, color, functional elements such as bristles and tufts, and decorations. This typically involves batch manufacturing, including switching over certain processes and equipment resulting in equipment downtime. Additionally high volumes of one product design need to be stored or buffered in batches in those cases where different designs want to be combined to be included into one single package. Manual tooth brushes for example are often sold in multipacks that include different colors of the same product form. Changeovers in injection molding processes can be minimized by injecting different colors simultaneously to different cavities in the mold, but this increases complexity of machinery.

It is familiar to those in the art to use extrusion blow molding to create single-component or single-material lightweight hand-held articles, such as children's toys, plastic bats, plastic golf clubs or any large, plastic article which benefits from being lighter in weight. While these articles can be both stiff and strong in bending, they also generally contain drawbacks which would limit their general use in semi-durable, Class-I medical devices, such as toothbrushes. First, such articles typically contain significant flash along parting lines, or in any locations where the parison is larger in cross sectional area than is the cavity to which it is blown. In these locations the parison folds within the cavity and substantial flash is created, even in the absence of cavity parting line. Second, most articles contain some significant vestige of blowing in the form of a hole, which may be accurately or inaccurately formed. Such a vestige would be regarded as a significant defect in a Class-I medical device which must prohibit breach or entry of contaminants to a hollow interior which does not drain effectively. Third, the relative size of these articles is large in comparison to the size of these defects, and the overall function of the articles is not severely affected by these defects. In many cases, the size of the article itself renders the manufacturing process easier, with respect to the minimization of defects. It is not challenging to extrusion blow mold articles, packages or bottles in the size range common to manual toothbrush handles—if the plastic wall thickness can be minimized in proportion to the overall cross section. Such articles exist in the form of small, typically squeezable, tubes or bottles which in fact benefit from having a very thin, deformable wall which enables dispensing of internal contents, making them unusable or significantly inferior as toothbrushes.

Extrusion and injection-blow-molded handles for single-component semi-durable consumer goods such as feather dusters and tape dispensers are also known, but again these articles would not meet criteria for semi-durable Class I medical devices, specifically with regard to the sealing of the necessary blowing orifice against intrusion of water or other contamination, and in the case of extrusion blow molding, in the appearance of flash on the articles in areas that would directly contact or go into the mouth. These articles can also be brittle, and when too much force is applied, can break or snap suddenly and without ductility, producing sharp edges, making them unusable for use in the oral cavity.

Multi-material blow molded packages, such as water bottles, are known to those familiar in the art. In these embodiments, smooth blow molded bottles are provided with tactile, high-friction surfaces via the use of an in-mold labeling technique, whereby previously injection-molded, textured labels are placed into mold cavities prior to introduction and blowing of the semi-molten parison of extruded plastic. While these articles do provide the advantage of a large gripping surface which is improved by addition of a high-friction textured surface, they are by nature highly-deformable or squeezable packages designed for liquid storage and dispensing and would serve poorly as toothbrushes as there is no obvious method to attach bristle tufts without injection molding. Further, the injection molding of the soft-grip labels requires an additional set of mold cavities and a molding step separate from the blow molding step.

It has also been proposed to manufacture hollow toothbrushes, and in fact it should not prove challenging to injection blow mold or even injection-stretch blow mold such an article in the general shape and size of a toothbrush or toothbrush handle, as stated previously, however no existing disclosure in the prior art addresses the issues of: Strength in bending, stiffness in bending, overall rigidity, mitigation of flash or other sharp defects, variations in cross-sectional area, and obstruction or sealing of the blow hole vestige. Any one of these defects in a blow molded toothbrush or toothbrush handle would severely affect the utility of the article, and as such, improvements are needed to enable a hollow article with material savings maximized by uniform wall thickness which is suitably strong and stiff in bending without breaking in use and does not leak or present uncomfortable defects to the user.

In view of these disadvantages reflected in the prior art, it is an objective of the present invention to provide an improved method for producing a toothbrush handle, which avoids the drawbacks of the prior art.

SUMMARY OF THE INVENTION

A method for extrusion blow molding a toothbrush handle is provided that comprises providing an extrusion blow mold having a longitudinal axis and a cavity, the cavity having a surface that defines a cross-sectional area; wherein the cavity has at least one of a maximum cross-sectional area, bordered by two smaller cross-sectional areas along the longitudinal axis of the blow mold or a minimum cross sectional area bordered by two greater cross-sectional areas along the longitudinal axis of the blow mold; extruding a parison comprising a thermoplastic material, the parison includes an interior cavity and an outer surface, wherein the outer surface defines a cross-sectional area of the parison; contacting the parison with the extrusion blow mold cavity; and expanding the parison using a fluid to produce a toothbrush handle having an inner cavity.

A method for extrusion blow molding a toothbrush handle is provided that comprises providing an extrusion blow mold having a longitudinal axis and a cavity, the cavity having a surface that defines a cross-sectional area; wherein the cavity has at least one of a maximum cross-sectional area, bordered by two smaller cross-sectional areas along the longitudinal axis of the blow mold or a minimum cross sectional area bordered by two greater cross-sectional areas along the longitudinal axis of the blow mold; extruding a parison comprising a first thermoplastic material and a second thermoplastic material, the parison includes an interior cavity and an outer surface, wherein the outer surface defines a cross-sectional area of the parison; contacting the parison with the extrusion blow mold cavity; and expanding the parison using a fluid to produce a toothbrush handle having an inner cavity.

BRIEF DESCRIPTION OF THE DRAWINGS

FIG. 1 is a sectional view of an extrusion step in an extrusion blow molding process according to an embodiment of the present invention.

FIG. 1A is a sectional view of an extrusion step in an extrusion blow molding process according to an embodiment of the present invention.

FIG. 1B is a sectional view of an extruded parison produced during an extrusion blow molding process according to an embodiment of the present invention.

FIG. 1C is a perspective view of an extruded parison produced during an extrusion blow molding process according to an embodiment of the present invention.

FIG. 2 is a sectional view of an extrusion blow mold process for producing a toothbrush handle according to an embodiment of the invention.

FIG. 2A is a cross-sectional view of FIG. 2 along section line 2A according to an embodiment of the present invention.

FIG. 2B is a cross-sectional view of FIG. 2 along section line 2B according to an embodiment of the present invention.

FIG. 2C is a cross-sectional view of FIG. 2 along section line 2C according to an embodiment of the present invention.

FIG. 2D is a sectional view of a blow mold process for producing a toothbrush handle according to an embodiment of the invention.

FIG. 3 is a sectional view of an extrusion blow mold process for producing a toothbrush handle according to an embodiment of the invention.

FIGS. 4-5 are sectional views an extrusion blow molding process for producing a toothbrush handle according to an embodiment of the present invention.

FIG. 10 is a diagram of an extrusion blow molding process for producing a toothbrush handle according to an embodiment of the present invention.

DETAILED DESCRIPTION OF THE INVENTION

Figure 6:
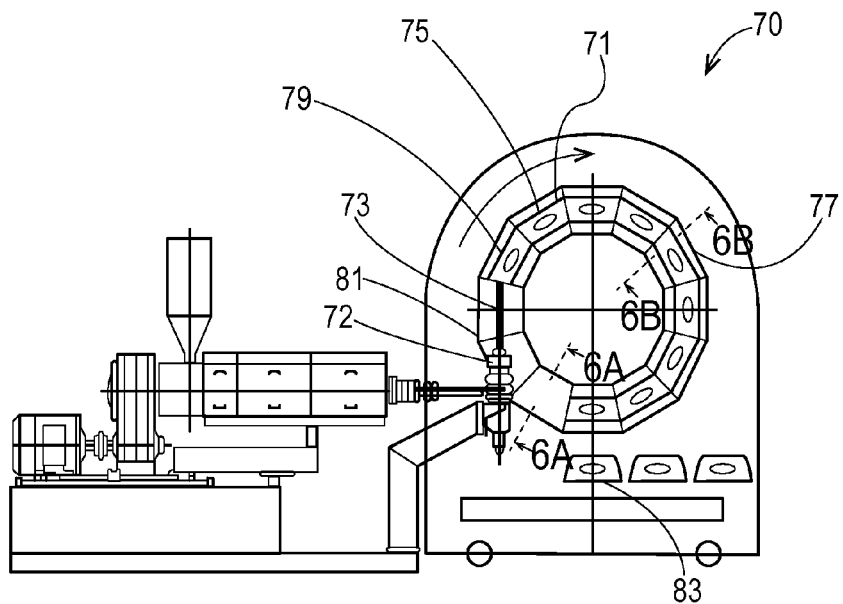
FIG. 6 is a diagram of an extrusion blow molding process for producing a toothbrush handle according to an embodiment of the present invention.

The present invention relates to one or more methods for producing personal care articles, such as a toothbrush handle having an inner cavity, wherein the method includes a blow molding step. The blow molding step can be used on (1) a semi-molten, extruded hollow tube of plastic (parison)—extrusion blow molding, or (2) on a previously injection-molded hollow body (preform)—injection blow molding, or (3) on a welded or assembled hollow tube of heated, semi-molten plastic, or (4) on one or more thin sheets of plastic which are blown into incomplete portions of a cavity, or cavity-halves, and assembled after blowing; and involves the positioning of a parison or preform into a cavity and expansion of the parison or preform to the cavity walls using pressurized fluid. The pressurized fluid can be pressurized positively with respect to atmosphere or pressurized negatively with respect to atmosphere, i.e. in the form of a partial vacuum. In certain embodiments, an injection blow molding process may comprise a second step, a stretch rod may be used to elongate the hollow injection molded preform during the blow molding step—injection stretch blow molding.

Personal care articles are items used to store, dispense, apply or deliver benefits to a consumer's personal health, beauty, grooming, or other body or human biological system care, maintenance, enhancement or improvement. Examples of personal care articles include, but are not limited to toothbrushes, toothbrush handles, razors, razor handles, mop handles, vacuum handles, makeup or beauty care applicators, skin care applicators, feminine hygiene applicators, hair care applicators, hair colorant applicators, or hair care articles.

As shown in FIG. 1, in extrusion blow molding, a semi-molten thermoplastic material is extruded through an annulus 53 of an extruder 50, which also comprises an inner mandrel 55 and an outer die 57 to produce a tubular shaped parison 51. The semi-molten thermoplastic material may be extruded at a rate of from about 2.54 mm/sec to about 153 mm/sec or from about 25.4 mm/sec to about 127 mm/sec and may have a temperature of from about 100° C. to about 300° C. or from about 140° C. to about 250° C. In certain embodiments, as shown in FIG. 1A, which shows a detailed section of the extruder 50 with a core tubular shaped parison 51, to produce a parison 51 having more than one layer, the extruder 50 includes at least one other material injection mechanism 62, which as shown in FIG. 1A can be another extruder nozzle typically placed downstream from the first controlled by a valve 63 to inject a second thermoplastic material 64 providing one or more physical properties to a toothbrush handle, which may be the same or different from any previous or subsequent thermoplastic material. Examples of physical properties include texture, coefficient of friction, stiffness, softness, or as illustrated FIG. 1A, provided by addition of colorant C1 to the second thermoplastic material 64 or alternatively directly into the parison 51 to color it with colorant C1. In certain embodiments there may be a further material injection mechanism 65 controlled by a valve 66 injecting a third thermoplastic material 58, providing one or more physical properties to a toothbrush handle, which may be the same or different from any previous or subsequent thermoplastic material, as explained previously. In this instance, as with the second thermoplastic material the physical property is color provided by addition of colorant C2 to the third thermoplastic material 58, which is extruded on the outside surface of the parison 51 or alternatively the colorant C2 could be added directly into the parison 51 to color it with colorant C2, for example as shown in FIG. 1A there is a multilayer parison 51 where the colored thermoplastic material 64, 58 is injected to form a layer on the outer surface of the parison 51 in sequential patterns. Colorants C1 and C2 can be injected in a way to create different colors along the parison 51 as it leaves the extruder 50. The extruder can have more than two color mechanisms to create even more variety in colors. FIG. 1B shows an injection of colorant C1, C2 that is coloring the entire parison 51 in sequential patterns. FIG. 1C shows multiple colorants C1, C2 applied around the circumference of the parison 51.

The thermoplastic materials from which a toothbrush handle can be made is limited by (1) strength or resistance to bending and axial loading, (2) toughness, as the opposite of brittleness, (3) Class I medical device requirements, (4) chemical compatibility with a variety of toothpastes and active chemistries therein, (5) chemical compatibility with other components which are typically attached to toothbrush handles such as, decals, printed inks, labels, grip elements and the like, and (6) melt flow and melt strength compatible with extrusion blow molding or injection blow molding. Thermoplastic materials meeting these criteria that can be used to make toothbrush handles include polypropylenes (PP); nylons (polyamides) (PA); polyethyleneterapthalates, including polyethyleneterpthalate glycols (PET & PET-G);

low-density and high-density polyethylenes (LDPE & HDPE); polyesters (PE); polyvinylchlorides (PVC); and engineering plastics such as Acrylonitrile Butadiene Styrene (ABS), polyphenylene ether (PPE), polyphenylene oxide (PPO). Any sub-types of these materials or other thermoplastics, including blow-molding-grade thermoplastics, with melt flow indices between 0.3 and 3.0 can be used if a blow molding process is used. Few materials outside of thermoplasts can satisfy all the requirements, however blow molded metal objects are known, and some alloys of zirconium can be formed into hollow shapes using blow molding techniques.

In certain embodiments two or more thermoplastic materials can be used to produce a toothbrush handle, for example a hard plastic material such as PP, PET, PET-G, LDPE, HDPE and one or more thermoplastic elastomers (TPE) chemically compatible with the first material. Examples of TPEs include Sytrenics (S-TPE), Copolyesters (COPE), Polyurethanes (TPU), Polyamides (PEBA), Polyolefin blends (TPO) and Polyolefin alloys (TPV). For example a Polyolefin-based TPE such as TPO would be used with a polyolefin based hard plastic such as Polypropylene, and both are introduced into the extrusion parison to form a toothbrush handle comprising portions made of different thermoplastic materials integrally connected to each other. For example, in toothbrush handles the surface portions that are contacted by the thumb or the finger tips can be made of soft plastic, whereas the remaining portions of the toothbrush handle can be made of hard plastic to give the toothbrush sufficient rigidity. The extruded parison made of different thermoplastic materials is then blow molded in the cavity to create the final shape, wherein portions of different material may be deformed.

In certain embodiments of the present invention, a toothbrush handle may be made from multiple layers of material to create different tactile surfaces in a single step in a single molding cavity. Generally, in a multi-layer embodiment, an inner, or substrate, layer is made from a first material which is the main load-bearing material and is typically thicker than subsequent outer layers; and an outer layer may be made from a softer material which may have a higher coefficient of friction with skin, or other improved tactile features.

Layers may be made in one of three ways: (1) They may be prepared upstream of an extruding orifice in the case of extrusion blow molding or extrusion welding, in which case the layers are melted and brought together and co-extruded integrally with one another, which is known as multi-layer extrusion blow molding, for example as shown in FIGS. 1A-1C, or (2) they may be injection molded together as is taught in EP 1 559 529 and EP 1559 530 then blown in a second step, or (3) they may be prepared separately through discrete processes and brought together only during the molding stage, where a parison of substrate material is extruded and a second material is extruded then cut into a patch or coupon, or is alternately injection molded by itself, and then placed into the mold cavity, which is known to those familiar in the art as in-mold labeling.

In multi-layer extrusion blow molding, multiple materials may be extruded in different manners, for example one manner in concentric layers, the second in a radially-varying manner and the third in an axially-varying manner whereby material or color varies along the extrusion axis. In all three manners, the extruded parison is created by introducing different materials at specific locations and injection pressures upstream of the extrusion annulus. Using this method, toothbrush handles with up to seven layers or multiple stripes can be produced. In the third manner wherein material or color varies along the extrusion axis, the injection port may selectively open and close during the formation of a parison that will form a toothbrush handle.

With reference to FIG. 1 the position of the die 55 and mandrel 57 may be adjustable to allow variation of the wall thickness of the parison 51. The semi-molten thermoplastic is extruded at a temperature sufficiently high to create a homogeneous amorphous structure in the continuous parison, but also at a temperature sufficiently low to allow the tube to carry some load across its longitudinal direction; as the parison 51 may either hang vertically from the extrusion annulus 53, or may be carried or pulled in a non-downward direction.

The parison 51 may be extruded at a speed sufficient that its temperature throughout the length of the final molded toothbrush handle does not fall below a glass transition temperature, or temperature necessary to substantially deform the parison by applied pressure; as the heat transfer from the parison 51 to air is low, and it may be expected that the parison 51 temperature can be stable for more than several seconds following extrusion from the annulus 53. The average cross-sectional area of the extruded parison 51 may be smaller than the average cross-sectional area of the resulting toothbrush handle, and may even be smaller than the cross-sectional diameter of 90% or more the toothbrush handle throughout its length.

Two or more cavity sections, in this instance as shown in FIGS. 1 and 2 are two cavity sections 59A, 59B of the extrusion blow mold 59 are constructed such that their cavity surfaces 60, when the cavity sections 59A, 59B are brought together form an extrusion blow mold cavity 61, which in certain embodiments may be an approximate negative of the desired toothbrush handle shape that will be created from an extruded parison. As shown in FIG. 1 the mating cavity halves 59A, 59B are separated from one another by a distance (D) at least greater than the parison 51 cross-sectional area to allow the introduction of the parison 51, and are brought together, as shown in FIG. 2 once they surround a length of the parison 51 sufficient to create a toothbrush handle.

FIG. 2 shows the cavity halves 59A, 59B closed around the parison 51 to form an extrusion blow mold cavity 61. As shown in FIGS. 2 and 2A the parison 51 has a cross-sectional area ($PA_{CA}$) which is the total area of the cross-section as defined by the outer surface 54 of the parison 51. FIG. 2B shows the extrusion blow mold cavity 61 has a cross-sectional area ($EC_{CA}$), which is the total area of the cross-section as defined by the extrusion blow mold cavity surface 60. As shown in FIG. 2C the maximum cross-sectional area $EC_{CAM}$ of the extrusion blow mold cavity 61 is greater than the maximum cross-sectional area $PA_{CAM}$ of the parison 51. Further, as FIG. 2D shows, to form contours in the extrusion blow mold cavity 61, in certain embodiments a maximum cross-sectional area $EC_{CAM}$ is bordered along the longitudinal axis $L_{EM}$ of the extrusion blow mold 59 by cross-sectional areas $EC_{CA1}$, $EC_{CA2}$, each having a smaller area than the area of the maximum cross-sectional area $EC_{CAM}$. In certain embodiments contours may also be formed in the extrusion blow mold cavity 61 by having a minimum cross-sectional area $EC_{CAMN}$ bordered along the longitudinal axis $L_{EM}$ of the extrusion blow mold 59 by cross-sectional areas $EC_{CA3}$, $EC_{CA4}$, each having a greater area than the area of the minimum cross-sectional area $EC_{CAMN}$.

FIGS. 2 and 3 show that once the cavity halves 59A, 59B have closed around the parison 51, a pressure differential is produced between the interior cavity 52 and outer surface 54 of the parison 51, either by application of an above-atmospheric (positive) pressure to the parison interior cavity 52, or a below-atmospheric (negative, or vacuum) pressure to the outer surface 54 (between the parison wall and the cavity inner wall). This pressure differential causes the parison 51 to expand and increase in cross-sectional area until it contacts the cavity surface 60, at which point the rate of cooling of the molded parison 51 increases substantially. In the case of in-mold labeling, some portion of the parison contacts the cavity surface and some portion contacts the label instead of the cavity surface.

In those embodiments where positive pressure is introduced to the interior of the parison, which may be in the range of from about 2.8 bar to 12 bar, there should be fluid communication from the interior of the parison to a high-pressure source of fluid. Wherein fluid may include air or other gases, such as nitrogen. In certain embodiments, this communication may be provided by cutting the cavity-enclosed portion of the parison off, and blowing a fluid, such as air in through the resulting hole from a pressurized source or reservoir. In certain embodiments, a needle may be used to punch a hole in the parison wall and inject high-pressure air through the hole. In still further embodiments, the air may be directed or guided through the hole in the top of the parison that is the result of cutting the portion of the parison that is held within the cavity. In this embodiment, it may also be desirable to widen this hole by blowing air prior to injection of an air nozzle within the parison, and this is known to those familiar in the art as providing support air.

In certain embodiments where negative pressure is introduced between the parison wall exterior surface and the cavity surface a partial vacuum may be created, wherein the vacuum may range from about 0.1 bar to 0.9 bar below atmospheric or from about 0.3 bar to 0.7 bar below atmospheric. Such a vacuum can be communicated from an external source to the cavity between the parison wall exterior surface and the cavity surface. In an embodiment, one or more small holes are made through the cavity wall to the external source to allow this communication. The relatively low viscosity of air, combined with the small volume of air to extract allows the communication hole or holes to be small enough such that material in the parison wall coming into contact with the hole or holes does not substantially deform through the hole or holes.

In certain embodiments a portion of the toothbrush handle mold cavity has a smaller cross-sectional area than the parison cross-sectional area so that this portion of a toothbrush handle may be formed purely by compression of the mold cavity halves during the closing of the mold cavity halves. In this case the hollow portion 52 within the parison 51 may be squeezed completely shut, which can result in high plastic pressures in the compressed portion of the parison 51 favorable to compression molding and allowing more accurate formation of features. Application of the pressure differential via fluid may help form this portion, or may help to fully fill out the cavity. This portion of the toothbrush may, for example, contain the geometry used to snap, screw, or otherwise attach to a separate component of the toothbrush, such as the head, or a cap on the base, or a decorative or gripping element elsewhere on the toothbrush. The portion of the resulting molded toothbrush handle may contain fold lines and possibly attached flattened material where the parison is compressed between the cavity walls outside of the useful portion of the cavity. This extra material is called flash, and should be removed or will naturally be cut off from the rest of the molded toothbrush handle. The cutting or removal of flash will sometimes leave a vestige or spur on a toothbrush handle. This flash vestige may be trimmed in a subsequent step, or may be covered by a toothbrush head, neck or cap so that it is not visible to the user. The flash vestige may be positioned on the toothbrush handle to function as a crush rib or interference portion to create an improved fit of a head or neck or cap.

As the parison 51 cools under pressure differential, the final shape of a toothbrush handle is produced, which in certain embodiments as shown in FIG. 3A is a toothbrush handle.

The cavity halves 59A, 59B, as shown in FIGS. 4 and 5 are opened the solidified toothbrush handle 56 is separated and removed from the extrusion blow mold cavity 61.

In certain embodiments of the invention, additional layers to the hollow toothbrush handle can be added by the method of In-Mold Labeling (IML). IML is used to place and position labels, such as TPE labels at one or more specific locations on the surface of the toothbrush handle. IML is the inclusion of one or more previously-manufactured flexible but solid components that will form an intrinsic part of the toothbrush handle by attaching and conforming intimately to the outer surface of the blow molded part. Positioning of the IML can be used to enhance the cosmetic appearance, texture, grip, feel, friction, coefficient of friction, or softness of the toothbrush handle, for example by using a vacuum to secure labels in position on the inner cavity wall of the mold prior to molding or using vacuum or vent ports to provide both positioning of the label in the part and a texture to the outer tactile surface of the IML portion of the toothbrush handle. The thickness and durometer of the TPE are selected to allow the TPE to deform substantially, and at least partially re-melt at the contact surface with the parison, so that labeling around a compound corner can be achieved with satisfactory cosmetic results.

Labels may include decorative elements, soft-touch elements (with a durometer between Shore A of about 20 and Shore A of about 90), grip areas, textured features, self-healing elements, brand or logo placements, hard materials, tufted inserts, or multiple-purpose elements. Further, labels can be made with a tactile surface-area-to-volume ratio (TSAV ratio) that is typically greater than can be achieved with injection molding. The TSAV for a label is defined here as the ratio of surface area visible or touchable by a user to the displaced or occupied volume of the label. For example, an insert may be from about 0.1 mm to about 0.4 mm thick and have a tactile cross-sectional area greater than about 400 $mm^2$ This label would therefore have a TSAV of 10 $mm^{-1}$ to 2.5 $mm^{-1}$. For injection-molded second components, it is difficult to achieve a TSAV greater than 2.0 $mm^{-1}$, whereas for in-mold labeling TSAV>10 $mm^{-1}$ is practical. A high TSAV is a distinct advantage for materials whose primary benefit derives from surface features such as coefficient of friction, color, surface texture or other decoration.

In certain embodiments of a multi-layer toothbrush made via IML, labels thickness is thin enough to substantially deform during the blow molding step so that labels conform to the three-dimensional shape or contours of the molding cavity and retain that shape after the toothbrush handle is removed from the mold. In certain embodiments labels made from a TPE based material may be under 0.30 mm, 0.25 mm, 0.20 mm or 0.10 mm thick. For example labels made from a polypropylene-based TPE in the Shore A 30-50 range may be under 0.25 mm thick when the polypropylene part wall is 1-3 mm thick to ensure adequate forming to mold cavity contours having radii of curvature less than 0.5/mm.

In another embodiment of a multi-layer toothbrush made via in-mold labeling, labels have a thickness allowing them to adhere chemically via re-melt to the blown parison during blown molding, but do not deform substantially at the outer surface. In some instances of this embodiment, labels may be pre-textured in an earlier extrusion step via embossing, or in an injection molding step. In this embodiment, labels may be thicker than 0.25 mm, 0.30 mm, or 0.40 mm.

In a still further embodiment of a multi-layer toothbrush made via IML, the label thickness is thin enough, for example thicker than 0.10 mm, 0.15 mm, or 0.2 mm to substantially deform during the blow molding step so that labels conform to and retain the macro-structure or macro-texture of the mold surface, but not so thin that they retain the micro-structure of the mold surface. In this instance, macro-structure is defined to comprise texture or features on a length scale greater than 0.1 mm such as tactile ribs, bosses, dimples or bumps; and micro-structure is defined to comprise texture or features on a length scale less than 0.01 mm such as grit-blasted textures, matte textures, witness lines or parting lines. In this embodiment, labels should be thicker than 0.10 mm.

In certain embodiments of the present invention, the TPE labels are die cut. In other embodiments of the invention, the TPE labels are injection molded in a separate first step and are inserted into the blow mold cavity in a separate second step.

Labels may also be pre-decorated or pre-printed prior to installation during molding. The printing can be done on the outside surface of the label, or if the label is transparent or translucent, the printing can be done on the inner surface of the label that will be in contact with the toothbrush handle outer surface. In this embodiment, the printed label's inner surface can be isolated from the user, from chemicals, and water, which provides for improved durability.

In addition to vacuum-assisted In-Mold Labeling (IML), there are a number of methods by which decoration can be added to a toothbrush handle. For example, a shrink sleeve may be wrapped around a toothbrush or portion thereof, for instance a toothbrush handle and shrunk by application of heat, steam, or both to create a form-fitting decorative sleeve which is tightly attached to the handle. This sleeve may have one end wrapped over a shoulder to which a head or head and neck portion is attached. The sleeve may also have the other end tucked under a cap, for which the molded portion of the handle is designed. This may serve to seal one or both open edges of the shrink sleeve and protect from entry of water or other contaminants, or may just assist in decoration, design, and feel in the hand. Either end, neither end, or both ends of the sleeve may be tucked and contained under a separately attached part such as a head or a cap.

In another embodiment, decoration may be printed directly onto the surface of a toothbrush handle following the blow molding operation. The printing of decoration may also be performed on the parison after extrusion but before the blowing operation to take advantage of the single ruled nature of the extruded parison outer surface prior to blowing into a compound surface that would be difficult or impossible to print efficiently.

Figure 7:
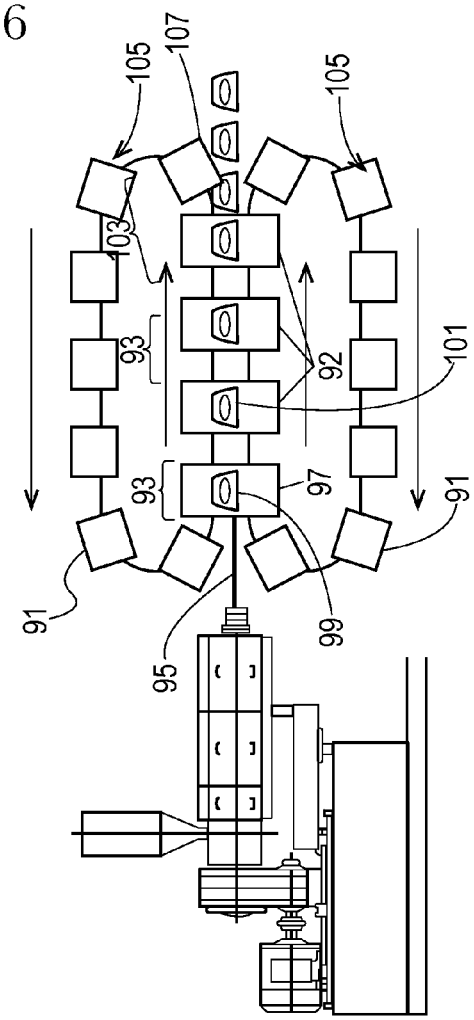
FIG. 7 is a diagram of an extrusion blow molding process for producing a toothbrush handle according to an embodiment of the present invention.

Extrusion blow molding molds may be arranged in at least three configurations for large-scale manufacturing: in a first configuration, molds are transported along a wheel, in a second configuration the molds are moved along on opposing tracks (caterpillar system), and in a third shuttle configuration molds open and close around extruded parisons. It should be noted that while FIGS. 6 and 7 show an extruded parison entering blow molds the same blow molding configurations may be used in an injection blow molding method, wherein a preform would enter a blow mold instead of an extruded parison. In the case of injection blow molding, the perform could be taken directly from an injection mold cavity to a blow mold cavity while still hot, or it could be taken from the injection mold cavity to storage, followed by re-heating at an intermediate step, and then subsequently into the blow mold cavity, and this is known to those familiar in the art as re-heat injection blow molding.

Figure 6B:
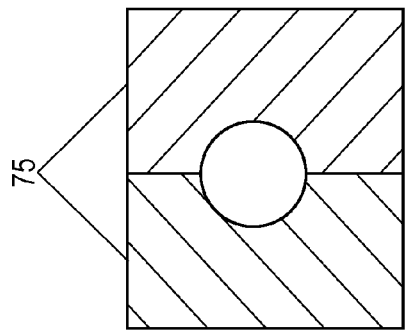
FIG. 6B is a cross-sectional view of FIG. 6 along section line 6B according to an embodiment of the present invention.
Figure 6A:
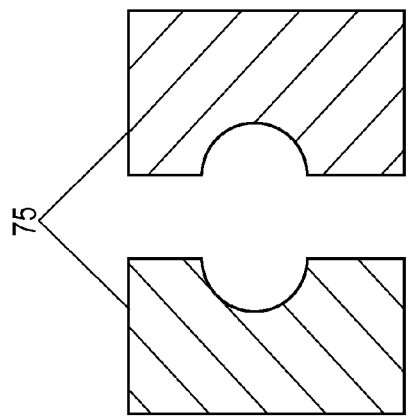
FIG. 6A is a cross-sectional view of FIG. 6 along section line 6A according to an embodiment of the present invention.

In the wheel configuration, as shown in FIG. 6, blow mold 71 cavity halves 75 are mounted in mated pairs on a wheel system 70 in such a manner that the parison 73 extrusion direction is approximately tangent to the outer edge of the wheel 77. An extruder 72 can extrude the parison 73 substantially upward against gravity, substantially downward coincident with gravity, or any direction in between. Cavity halves 75 move relative to one another substantially in one direction to open, as shown in FIG. 6A, and in the opposite direction to close, as shown in FIG. 6B—to produce a blow mold 71, in which this direction is parallel to the axis of the wheel 77 and orthogonal to the extrusion direction of the parison 73. In this manner, cavity halves 75 may close upon the parison 73 when the longitudinal direction of the blow mold cavity 79 is approximately parallel to the parison 73 extrusion direction.

In this embodiment, the parison extrusion annulus 81 is stationary, and the wheel 77 rotates to move a parison 73 sealed in a blow mold 71 out of the way to accommodate further extrusion of the parison 73 for the next cavity pair 75 to move into place. As a blow mold 71 containing a sealed parison 73 moves, the pressure differential is introduced to expand the parison wall to the cavity inner walls of the blow mold cavity 79 and the parison 73 cools. After a specified duration of time and rotation of the wheel 77, the cavity halves 75 open and the substantially formed toothbrush handle 83 is extracted or ejected from the cavity halves 75. In this manner, extrusion of the parison 73 is substantially continuous toothbrush handles are formed from multiple cavities at a set rate per unit of time. Cavities in the wheel may be substantially identical to one another, or may vary in shape to allow a variety of designs to be formed from the same equipment without necessitating a line stop or change-over.

In a second embodiment, as shown in FIG. 7, cavity halves 91 are arranged on opposing tracks, 105 sometimes called caterpillar tracks, that rotate in opposite directions and allow cavity halves 91 to be held in mating contact with one another to produce a blow mold 92 where two or more blow molds 92 are transferred in sequence from a first location 93 where the parison 95 is extruded and captured by an open cavity pair 97, to a second location 96 where a pressure differential is introduced to the blow mold 92. The parison 95 is extruded between two open mated cavity halves 91 in continuous motion, which close together at a first location 93 by action of a track 105 on which they travel. Cavity halves 91 are oriented on the track 105, such that the toothbrush handle longitudinal direction is substantially parallel to the parison extrusion direction. When the cavity halves 91 are fully sealed, a pressure differential is created as described above, either by positive pressure, negative pressure, or a combination of both. The parison expands until it reaches the inner walls of the blow mold cavity, at which point cooling of the parison is substantially increased. When the parison has cooled sufficiently to hold its form, the cavity halves 91 are opened by action of the track 105 on which they follow, and the formed toothbrush handle is ejected.

Cavity halves 91 separate from one another and are returned to the first location 93 along the back half of the rotating continuous track 105.

In a shuttle cavity configuration, as shown in FIG. 8A, cavity halves 91 are mounted in mated pairs to produce a blow mold 92; where two or more blow molds 92 are transferred in sequence from a first location (A) where the parison 95 is extruded and captured by a blow mold 92, to a second location (B) where a pressure differential is introduced to the blow mold 92. At the first location (A), the blow mold 92 is held substantially motionless while the parison 95 is extruded into the blow mold 92. When the parison 95 has extruded into the blow mold 92 cavity, the blow mold moves to the second location (B). At the second location (B) a pressure differential is introduced to the blow mold 92 by positive pressure, negative pressure, or a combination of both, for example typically by positive pressure through a blowing nozzle or a blowing needle. The parison 95 expands in diameter until it reaches the cavity wall at which point cooling of the parison 95 is substantially increased. The sealed and pressurized blow mold 92 is typically held substantially motionless during the creation of the pressure differential and the cooling of the parison 95 until the parison 95 has cooled below its glass transition temperature or heat deflection temperature, to such a degree that its form has solidified. When the parison 95 has cooled sufficiently to hold its form, the cavity halves 91 are opened and the formed toothbrush handle is ejected, possibly at the second location (B) or in certain embodiments after moving to a third location. Cavity halves 91 separate from one another and are returned to the first position (A).

In any of the extrusion blow molding embodiments, it is possible to increase production rate, and thereby equipment efficiency, by extruding more than one parison simultaneously in a direction parallel and in close proximity to the first parison. For example, each parison may be enclosed entirely within its own cavity, but adjacent, non-mating cavity halves may be cut into the same mold. This allows for more efficient production, as a disproportionately large portion of the expense of an extrusion blow molding system may be involved in the cavity handling system, such as the wheel, shuttles, or caterpillar track. In one embodiment of multiparison extrusion, parisons are supplied by the same extruder, but split by a manifold into multiple parisons. In a second embodiment, parisons are fed by separate extruders. This second embodiment solves the problem of simultaneous production of multiple colors of articles, such as toothbrush handles, which simplifies post-production handling and installation of toothbrush handles into multiple-article packages in which not all toothbrushes are desired to be the same color.

In extrusion blow molding, there is typically a higher percentage of scrap material than in injection molding or injection blow molding, due to the extra material from the parison that exists between molded articles. The closing of the blow molds pinches the parison at the top and bottom and in some cases where the final toothbrush handle cross-sectional area is less than the parison cross-sectional area, on the sides as well, creating flash as described above. This flash, is typically trimmed off after the forming operation is complete. To solve the problem of excess flash, it is possible to mold two toothbrush handles facing one another across the plane normal to the longitudinal axis in a single cavity, trimming them apart after the forming operation is complete. In this embodiment, the pressure differential may be applied in any manner described, but may be applied as a positive pressure via a needle injection between the two handles. Parts molded in this manner may be described as 'kissing'.

Figure 8:
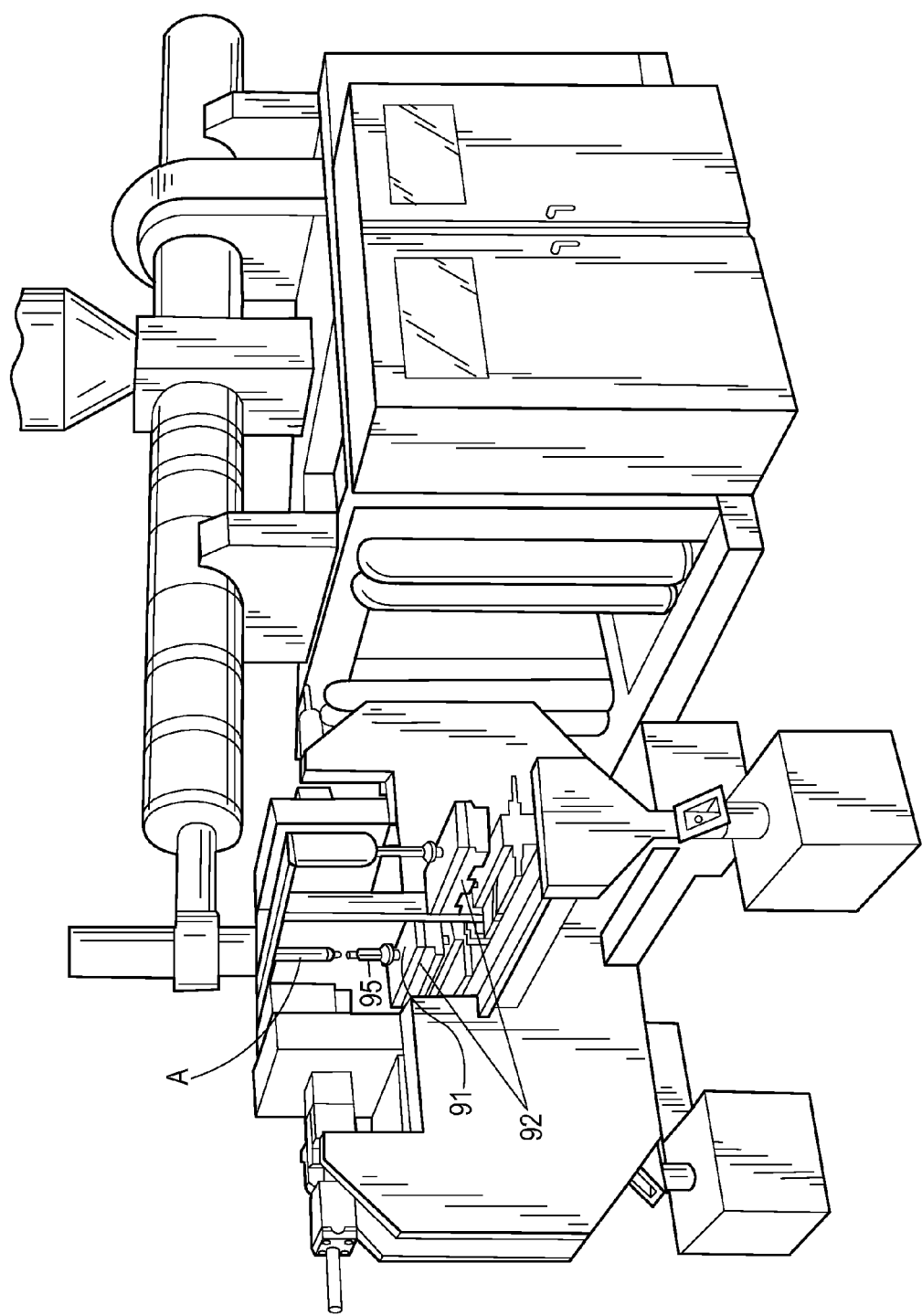
FIG. 8 is a diagram of an extrusion blow molding process for producing a toothbrush handle according to an embodiment of the present invention.
Figure 9:
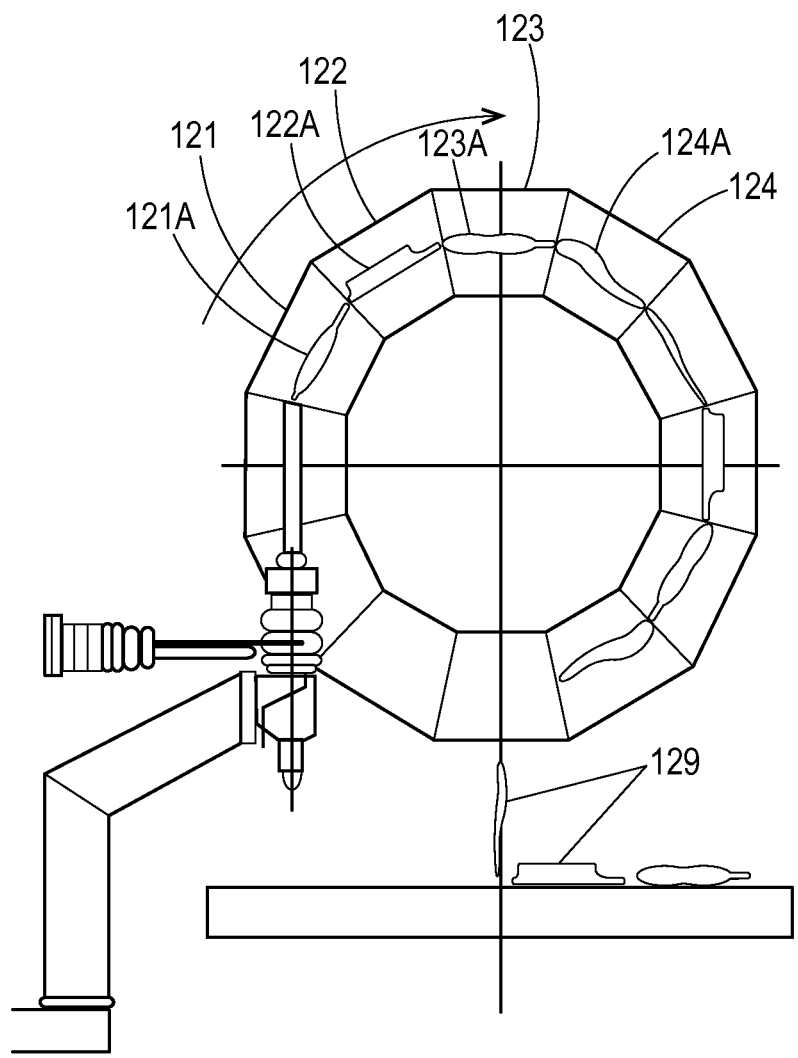
FIG. 9 is a diagram of an extrusion blow molding process for producing a toothbrush handle according to an embodiment of the present invention.

In addition, in any blow molding embodiment, such as that shown in FIG. 6-8, the blow mold cavities can differ from one blow mold to the next, so that a single process can produce multiple differing toothbrush handles in direct sequence. For example as shown in FIG. 17 blow molds 121, 123, 125, 127 mounted in a wheel configuration have a series of different shaped cavities 121A, 122A, 123A, 124A to create toothbrush handles 129 with different shapes.

Further, in any blow molding embodiment, such as that shown in FIG. 6 or 7, the blow molding configuration may include a labels insert mechanism 142, such as a servo-controlled placement arm or a robot arm, as shown in FIG. 10.

In certain embodiments the insert mechanism may contain multiple labels, for example as shown in FIG. 10 the insert mechanism 18 includes multiple labels L1, L2, L3. The labels $L_1$, $L_2$ can be placed inside the open cavity halves 141 by a handling and feeding mechanism 143. One or more labels $L_1$, $L_2$ can be placed inside a cavity 145 at the same time to form toothbrush handles 147, 148, 149 having different labels $L_1$, $L_2$, $L_3$. The labels can have different shapes, thickness, colors, texture, materials and print. The labels are typically held inside the tool cavity by vacuum or may be held in areas of tight curvature by friction and bending alone. In certain embodiments there are between about one to ten labels per mold or from about one to three labels per mold. In certain embodiments labels may be exposed on the outer surface of a toothbrush handle; or partially or completely embedded within the parison; or any combination thereof. For example a label may be completely or partially embedded in a transparent or translucent toothbrush handle so it can still be viewed or an label may be exposed on the toothbrush handle surface for viewing.

As the toothbrush handle leaves the manufacturing equipment the toothbrush handle can be post processed, decorated, assembled with other parts and packed.

Figure 11:
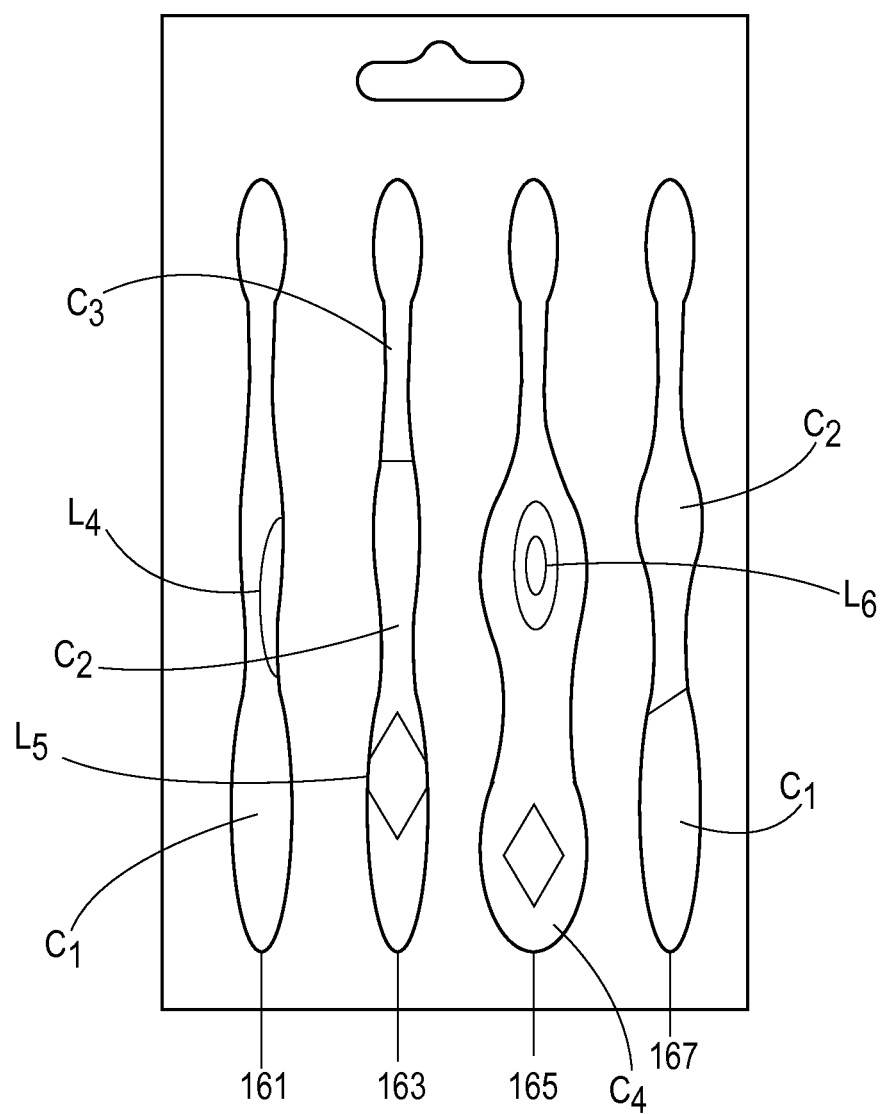
FIG. 11 is an illustration of toothbrush handles according to an embodiment of the present invention.

FIG. 11 shows a package containing a variety of toothbrushes 161, 163, 165, 167 each toothbrush having an individual and differing shape, color or color combinations C1, C2, C3, C4 and labels $L_4$, $L_5$, $L_6$.

Figure 12:
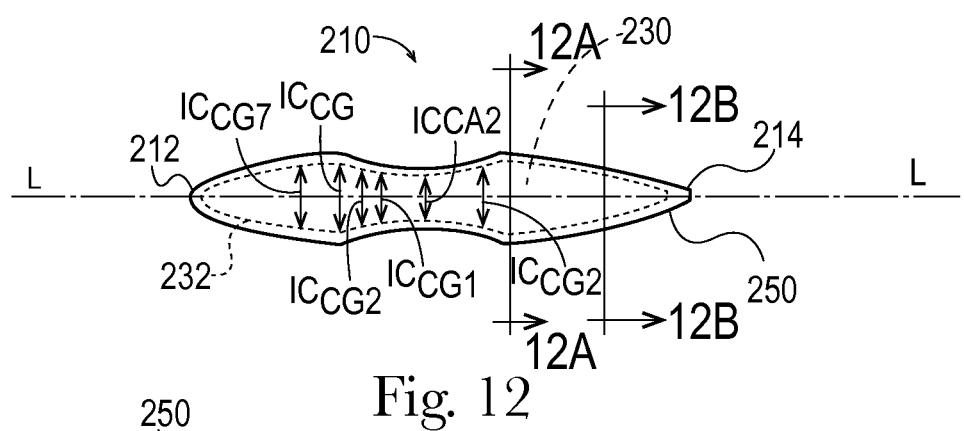
FIG. 12 is a perspective view of a toothbrush handle according to an embodiment of the present invention.
Figures 12A, 12B:
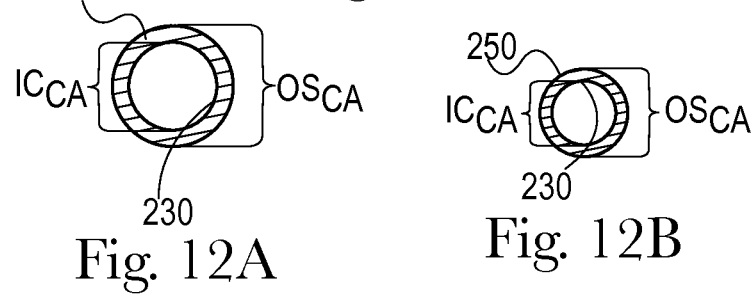
FIG. 12A is a cross-sectional view of FIG. 12 along section line 12A according to an embodiment of the present invention.
FIG. 12B is a cross-sectional view of FIG. 12 along section line 12B according to an embodiment of the present invention.

FIG. 12 shows an embodiment of a personal care article that can be produced using one or more of the methods of the present invention, in this instance a toothbrush handle 210, having a terminal end 212 and a connector end 214. The toothbrush handle 210 is unitarily formed as a single piece and comprises an inner cavity 230 and an outer surface 250, wherein the handle outer surface 250 varies in cross-sectional area ($OS_{CA}$), which is the total area of the cross-section as defined by the outer surface 250, along the handle 210 longitudinal axis L—as shown in FIG. 12A; in this embodiment the handle 210 has a substantially hourglass shape. The inner cavity 230 has an inner cavity surface 232, wherein the inner cavity surface 232 varies in cross-sectional area ($IC_{CA}$) along the handle longitudinal axis L. As FIG. 12 shows, in certain embodiments the inner cavity 230 of the handle 210 has one or more greater cross-sectional areas $IC_{CAG}$ bordered along the longitudinal axis L of the handle 210 by lesser cross-sectional areas $IC_{CAL1}$, $IC_{CAL2}$ having a smaller area than the area of the greater cross-sectional area $IC_{cag}$. A handle 210 inner cavity 230 may also have a lesser cross-sectional area $IC_{CAL}$ bordered along the longitudinal axis L of the handle 210 by greater cross-sectional areas $IC_{CAG1}$, $IC_{CAG1}$ having a larger area than the area of the lesser cross-sectional area $IC_{CAL}$. Further, as shown in FIGS. 12, 12A and 12B, in certain embodiments the square root of the inner cavity surface 232 cross-sectional area varies proportionally to the variations in the square root of the outer surface 250 cross-sectional area along the longitudinal axis L of the handle 210, with the exception of the areas near the terminal 212 and connector end 214 of the toothbrush handle where the inner cavity 230 becomes sealed. In certain embodiments the square root of the inner cavity surface cross-sectional area varies proportionally less than 5% to the variations in the square root of the outer surface cross-sectional area along the longitudinal axis L of the handle 210 with the exception of the areas near the terminal and connector end of the toothbrush handle. In certain embodiments the thickness of the toothbrush handle wall, the distance between the toothbrush handle outer surface and the inner cavity surface, varies in inverse proportion to the square root of the outer surface cross-sectional area. For example, in these embodiments areas of a toothbrush handle having a greater outer surface cross-sectional area will have a thinner wall (compared to areas having a lesser outer surface cross-sectional area) as the material has been stretched to a greater degree during the extrusion blow molding process. It is possible also in the case of extrusion blow molding to control the thickness of the wall prior to the blowing step to preferentially distribute more or less material to the wall thickness at different portions of the length of the brush, and this is known to those familiar in the art as parison programming. For toothbrush handles manufactured with parison programming, it is possible to create a toothbrush handle that has a wall thickness that is substantially uniform along the length of the toothbrush. Or, using parison programming it is also possible to create a hollow toothbrush handle whose wall thickness varies along the length independently of variations in cross sectional area or outer diameter. It is possible also in the case of injection blow molding to injection mold a preform with a wall whose initial thickness varies with length so that thicker or thinner wall sections can be blow molded during the blow molding step. In certain embodiments the thickness of the toothbrush handle wall and the thickness of the individual layers for those embodiments having two or more layers varies less than about 20%, 10% or 5% along the toothbrush handle longitudinal axis.

In certain embodiments a toothbrush handle may be made from multiple layers of thermoplastic material, for example to create different tactile surfaces. Wherein the layers of thermoplastic material may be present on or in the toothbrush handle outer surface. Generally, in a two-layer embodiment, an inner, or substrate, layer is made from a first thermoplastic material which is the main load-bearing material and is typically thicker than subsequent outer layers; and an outer layer may be made from a softer thermoplastic material which may have a higher coefficient of friction with skin, or other improved tactile features.

The toothbrush handles of the present invention having an inner cavity can help reduce the amount of excessive force being applied to the toothbrush during brushing, such as when using a typical solid manual toothbrush or electromechanical toothbrush. It is known to those familiar in the art that sustained, repeated brushing with a standard tufted, manual toothbrush with a force of greater than approximately 5.0 N can lead to a loss of gum tissue over time. For instance there exist electromechanical toothbrushes with integrated feedback systems to warn users when this force is exceeded during use. This suggests that a significant fraction of toothbrush users apply forces up to 5.0N through the toothbrush head.

Not all hollow, articles have sufficient bending strength to withstand 5N of force applied in bending normal to the major axis at a distance typical of that applied to a toothbrush between a thumb-fulcrum and the brush head. Certainly not all blow molded articles can withstand such forces: many blow molded packages, such as water bottles, must be filled prior to stacking in pallets as their walls are sufficiently thin that they will significantly deform in compression under even the weight of a few empty bottles on top of them. It is possible to make toothbrushes and toothbrush handles in a similar fashion, either through use of generally weak materials or through manufacture of extreme thinness of walls, such that they would appear strong, possibly due to use of opaque materials or other decoration. Toothbrushes made from these handles would not collapse under gravity or mild forces, and could appear robust in packaging or in a non-use display but in fact would be displeasing or impossible to use as intended, or to deliver sufficient brushing force to maintain oral health. Generally, toothbrushes or toothbrush handles which deform more than 10 mm under a 5.0N force applied to the center as determined by ASTM D 790 would not be desirable in use. In certain embodiments the toothbrush handles of the present invention deform less than about 10 mm under a 5.0N force applied as determined by ASTM D 790. In certain embodiments the toothbrush handles of the present invention deform less than about 5 mm under a 5.0N force applied as determined by ASTM D 790.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A toothbrush handle produced by a method comprising:
   a) providing an extrusion blow mold having a longitudinal axis and a cavity, the cavity having a surface that defines a cross-sectional area wherein the cavity has at least one of a maximum cross-sectional area, bordered by two smaller cross-sectional areas along the longitudinal axis of the blow mold or a minimum cross sectional area bordered by two greater cross-sectional areas along the longitudinal axis of the blow mold;
   b) extruding a parison comprising a thermoplastic material, the parison includes an interior cavity and an outer surface, wherein the outer surface defines a cross-sectional area of the parison;

c) expanding the parison using a fluid to contact the cavity surface and produce a toothbrush handle having an inner cavity; and the toothbrush handle comprising:

d) a terminal end, connector end, outer surface, inner cavity, and longitudinal axis;

e) the inner cavity having a surface defining a cross-sectional area; wherein the inner cavity has at least one of a greater cross-sectional area, bordered by two lesser cross-sectional areas along the longitudinal axis of the toothbrush or a lesser cross sectional area bordered by two greater cross-sectional areas along the longitudinal axis of the toothbrush;

f) the outer surface defining an outer surface cross-sectional area;

g) a wall formed from the outer surface and inner cavity surface having a thickness;

h) the toothbrush handle comprising a single unitary component; and wherein the toothbrush handle has a specific gravity below about 0.60 g/cm$^3$ and wherein the toothbrush handle deforms less than about 10 mm under a 5.0N force applied as determined by ASTM D 790.

2. The toothbrush handle of claim 1, wherein a square root of the outer surface cross-sectional area varies proportionally to a square root of the inner cavity cross-sectional area along the longitudinal axis of the toothbrush.

3. The toothbrush handle of claim 2, wherein a square root of the inner cavity surface cross-sectional area varies proportionally less than 5% to the variations in a square root of the outer surface cross-sectional area along the longitudinal axis of the toothbrush handle.

4. The toothbrush handle of claim 1, wherein the thickness of the toothbrush handle wall varies in inverse proportion to a square root of the outer surface cross-sectional area.

5. A toothbrush handle produced by a method comprising:

a) providing an extrusion blow mold having a longitudinal axis and a cavity, the cavity having a surface that defines a cross-sectional area; wherein the cavity has at least one of a maximum cross-sectional area, bordered by two smaller cross-sectional areas along the longitudinal axis of the blow mold or a minimum cross sectional area bordered by two greater cross-sectional areas along the longitudinal axis of the blow mold;

b) extruding a parison comprising a first thermoplastic material and a second thermoplastic material, the parison includes an interior cavity and an outer surface, wherein the outer surface defines a cross-sectional area of the parison;

c) expanding the parison using a fluid to contact the cavity surface and produce a toothbrush handle having an inner cavity; and the toothbrush handle comprising:

d) a terminal end, connector end, outer surface, inner cavity, and longitudinal axis;

e) the inner cavity having a surface defining a cross-sectional area; wherein the inner cavity has at least one of a greater cross-sectional area, bordered by two lesser cross-sectional areas along the longitudinal axis of the toothbrush or a lesser cross sectional area bordered by two greater cross-sectional areas along the longitudinal axis of the toothbrush;

f) the outer surface defining an outer surface cross-sectional area;

g) a wall formed from the outer surface and inner cavity surface;

h) the toothbrush handle comprising a single unitary component; and wherein the toothbrush handle has a specific gravity below about 0.60 g/cm$^3$ and wherein the toothbrush handle deforms less than about 10 mm under a 5.0N force applied as determined by ASTM D 790.

6. The toothbrush handle of claim 5, wherein a square root of the outer surface cross-sectional area varies proportionally to a square root of the inner cavity cross-sectional area along the longitudinal axis of the toothbrush.

* * * * *